US006775791B2

(12) United States Patent
McAfee

(10) Patent No.: US 6,775,791 B2
(45) Date of Patent: Aug. 10, 2004

(54) REPLACEABLE MEMORY MODULES WITH PARITY-BASED DATA RECOVERY

(75) Inventor: Martin E. McAfee, Lago Vista, TX (US)

(73) Assignee: Dell Products L.P., Round Rock, TX (US)

( * ) Notice: Subject to any disclaimer, the term of this patent is extended or adjusted under 35 U.S.C. 154(b) by 521 days.

(21) Appl. No.: 09/770,605

(22) Filed: Jan. 26, 2001

(65) Prior Publication Data

US 2002/0104037 A1 Aug. 1, 2002

(51) Int. Cl.[7] .............................................. H02H 3/05
(52) U.S. Cl. ............................................................ 714/6
(58) Field of Search ............................ 714/6, 7, 8, 5, 714/29, 42, 54, 718

(56) References Cited

U.S. PATENT DOCUMENTS

| | | | |
|---|---|---|---|
| 5,007,053 A | 4/1991 | Iyer et al. ................ 371/21.1 |
| 5,396,596 A | 3/1995 | Hashemi et al. ............ 395/250 |
| 5,463,643 A | 10/1995 | Gaskins et al. ............ 371/40.1 |
| 5,479,653 A | 12/1995 | Jones .................... 395/182.03 |
| 5,530,960 A | 6/1996 | Parks et al. ................. 395/825 |
| 5,592,616 A | 1/1997 | Finch et al. ............. 395/183.18 |
| 5,596,709 A | 1/1997 | Bond et al. ............. 395/182.05 |
| 5,680,539 A | 10/1997 | Jones .................... 395/182.04 |
| 5,761,705 A | 6/1998 | DeKoning et al. .......... 711/113 |
| 5,784,548 A * | 7/1998 | Liong et al. ................... 714/6 |
| 5,860,090 A * | 1/1999 | Clark ......................... 711/113 |
| 5,867,642 A | 2/1999 | Vivio et al. ............ 395/182.05 |
| 5,896,493 A | 4/1999 | Rao ....................... 395/182.04 |
| 5,898,861 A | 4/1999 | Emerson et al. ............ 395/500 |
| 5,909,583 A | 6/1999 | Hayes et al. ........... 395/750.01 |
| 5,913,927 A * | 6/1999 | Nagaraj et al. ................ 714/8 |
| 5,938,751 A | 8/1999 | Tavallaei et al. ............ 710/103 |
| 6,105,116 A | 8/2000 | Mori ......................... 711/162 |
| 6,223,301 B1 * | 4/2001 | Santeler et al. ................ 714/6 |
| 6,430,702 B1 * | 8/2002 | Santeler et al. ................ 714/6 |

OTHER PUBLICATIONS

U.S. Pending patent application Ser. No. 09/490,795 entitled "Rambus Memory Power Management Through Active Pool Management Policies Tailored to Portable Computer User Scenarios" filed by Verdun and assigned to Dell USA, L.P. (DC–02119), filed Jan. 24, 2000.

U.S. Pending patent application Ser. No. 09/634,816 entitled "Active Memory Pool Management Policies" filed by Verdun, et al and assigned to Dell Products L.P.(DC–02356), filed Aug. 8, 2000.

* cited by examiner

Primary Examiner—Dieu-Minh Le
(74) Attorney, Agent, or Firm—Baker Botts L.L.P.

(57) ABSTRACT

A memory system for a processor-based computing system. The memory system has a number of memory modules and a logic unit. The logic unit examines data to be stored in the memory modules and calculates parity data. It then distributes the input data and the parity data among the memory modules.

19 Claims, 3 Drawing Sheets

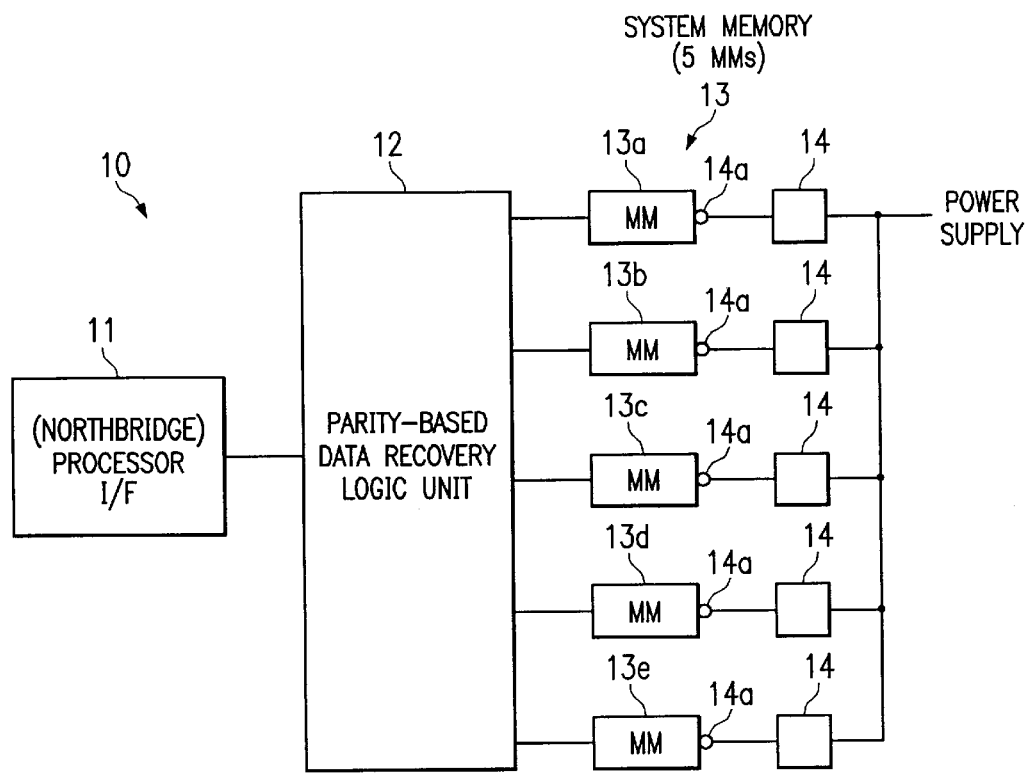
*FIG. 1*
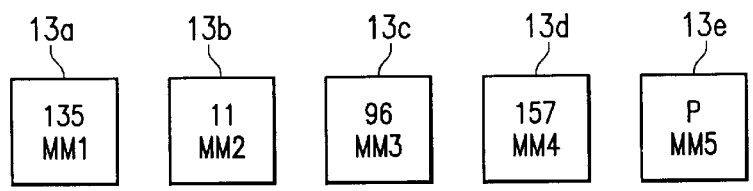
*FIG. 2*
| MEMORY MODULE | DATA VALUE | BINARY DATA VALUE | | | | | | | |
|---|---|---|---|---|---|---|---|---|---|
| | | BIT 7 | BIT 6 | BIT 5 | BIT 4 | BIT 3 | BIT 2 | BIT 1 | BIT 0 |
| a | 135 | 1 | 0 | 0 | 0 | 0 | 1 | 1 | 1 |
| b | 11 | 0 | 0 | 0 | 0 | 1 | 0 | 1 | 1 |
| c | 96 | 0 | 1 | 1 | 0 | 0 | 0 | 0 | 0 |
| d | 157 | 1 | 0 | 0 | 1 | 1 | 1 | 0 | 1 |
| SUM OF BITS | | EVEN | ODD | ODD | ODD | EVEN | EVEN | EVEN | ODD |
| PARITY VALUES | | 0 | 1 | 1 | 1 | 0 | 0 | 0 | 1 |
*FIG. 3*

REPLACEABLE MEMORY MODULES WITH PARITY-BASED DATA RECOVERY

TECHNICAL FIELD OF THE INVENTION

This invention relates to computing devices, and more particularly to computer memory systems.

BACKGROUND OF THE INVENTION

Today's computer systems, notably server and workstations, have large system memory banks. The memory bank is a group of modules that make up a logical memory unit. This type of design permits the computer system to be easily upgraded with more memory, and permits failed modules to be easily replaced.

In conventional computer systems, when a memory module fails, it is necessary to power down the entire computer system. This results in down time and the contents of the memory may be lost.

To prevent loss of data when system memory fails, many systems use "mirroring" techniques. This requires a doubling of memory capacity, and is an expensive and space-consuming solution.

In connection with memory systems, data recovery schemes have been associated with transfer of data from memory to the processor. A technique originally developed for recovering data on a failed disk drive has been applied in this context. More specifically, RAID (redundant array of inexpensive disks) techniques have been used to provide multiple channels for carrying data from memory to the processor. RAID techniques are used to stripe data across multiple channels and to calculate and transfer parity data with the original data. This method providing data transfer is described in U.S. Pat. No. 5,463,643, to Gaskins, et al., assigned to Dell USA, L.P.

SUMMARY OF THE INVENTION

One aspect of the invention is a memory system for a processor-based computer system. The system memory is arranged as a set of memory modules, each capable of receiving portion of a larger block of data. For example, the memory modules may be DIMMs. A logic unit is programmed to calculate parity data associated with a input data to be stored in the memory modules. It adds the parity data to the input data to form a block of data, and distributes the block of data among the memory modules. If a memory module fails, the logic unit may be called upon to calculate recovery data. The memory modules are connected to power in a manner that permits them to be "hot plugged", that is, removed without affecting operation of the rest of the computer system.

An advantage of the invention is that it provides for data recovery of data stored in system memory, without the need for duplicate storage that would be required for complete data redundancy. All that is required is the addition of hardware logic for parity-based data recovery calculations, and sufficient memory for storing parity data.

BRIEF DESCRIPTION OF THE DRAWINGS

FIG. 1 illustrates a computer memory system in accordance with the invention.

FIG. 2 illustrates one method of distributing data among memory modules, for a parity-based data recovery scheme.

FIG. 3 illustrates the stripe and parity values for the memory modules of FIG. 2, using the even-parity method.

DETAILED DESCRIPTION OF THE INVENTION

Figure 4:
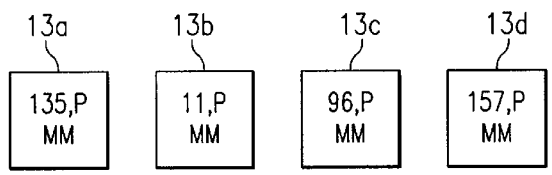
FIG. 4 illustrates an alternative method of storing stripe and parity values.

FIG. 1 illustrates a computer memory system 10 in accordance with the invention. As explained below, system memory 13 communicates with a processor (not shown) via a processor interface 11, and comprises multiple memory modules 13. A logic unit 12 implements a parity-based logic scheme and distributes data and parity information within the system memory 13.

Processor interface 11 is an interface that connects the computer processor (not shown) to the system memory. Conventional commercially available devices may be used to implement interface 11. An example of a suitable processor interface is a "northbridge" device, which is commercially available.

Programmable logic unit 12 implements a parity-based data recovery scheme that permits data stored in memory 13 to be recovered. As explained above, this scheme has been used in connection with hard disk drives, and in that context is known as RAID (redundant arrays of inexpensive disks).

Logic unit 12 may be implemented with a field programmable gate array, programmed to perform the functions described herein. An example of a suitable FPGA is a Virtex FPGA manufactured by Xilinx, Inc.

System memory 13 is implemented with a number of memory modules (MMs) 13a–13e. In the example of FIG. 1, there are five memory modules 13a–13e, but the invention may be implemented with any number of two or more memory modules. Memory modules 13a–13d are the system memory, also known as random access memory (RAM). Each module contains a number of RAM chips.

Examples of memory modules in wide use today are SIMMs (single in-line memory modules) and DIMMs (dual in-line memory modules). These modules are designed to be easily removed and replaced in a computer system. Typically, they are installed as circuit boards placed in sockets on a system board. The invention is not limited to these types of memory modules, and may be implemented with any type of modular system memory.

As stated above, logic unit 12 implements a parity-based data recovery scheme. Thus, it has logic circuitry programmed to perform the functions described herein. As explained below, it calculates parity information and controls distribution of data to the memory modules, and recalculates data if a module is removed and replaced.

Thus, if a module fails, its data may be recovered. FIG. 2 illustrates one method of distributing data for a parity-based data recovery scheme. As in the memory system of FIG. 1, there are five memory modules 13. The technique of FIG. 2 combines data striping and parity calculations to permit data recovery if a memory module 13 disk fails. Parity values are calculated for the data on a bit-by-bit basis. In an even-parity scheme, if the sum of a given bit position is odd, the parity value for that bit position is set to 1; if the sum is even, the parity bit is set to 0. (The converse is true for an odd-parity scheme.) In the following example, a block of data containing the values 135, 11, 96, and 157 is striped across four memory modules 13. A fifth memory module 13e is a parity module. Typically, regardless of how many memory modules are in a particular system, data is "striped" by being distributed in equal blocks across all memory modules other than the parity module. Thus, if the memory system has seven memory modules for storing data, the data would be XOR'd across the seven memory modules and the result stored in an eighth memory module.

FIG. 3 illustrates the stripe and parity values for the memory modules of FIG. 2, using the even-parity method. If one of the memory modules 13a–13d fails, the missing data may be regenerated by determining the appropriate value (0 or 1) of each missing bit. For example, if memory module 13b fails, the Bit 0 value of the missing data is determined by solving for 1+x+0+1=y, where y represents an odd number (because the parity value for Bit 0 is 1). In this case, Bit 0 on memory module 13b must be 1. The parity calculation is essentially an exclusive OR (XOR) function (modulo 2 arithmetic with no carry function).

The data striping and recovery scheme illustrated in FIGS. 2 and 3 is analogous to a RAID 3 scheme used for disk drive arrays. Both schemes use two or more data modules and a parity module. All parity data is written to a single memory module, here memory module 13e. Thus, memory module 13e acts as a dedicated module for storing the parity results of the XOR calculations.

Various modifications of the parity-based data recovery scheme have been implemented for disk drives, and are known as RAID "levels". For example in a RAID level 5 scheme, parity data is distributed among all drives rather than being stored on a dedicated parity drive.

FIG. 4 illustrates how parity data may be distributed among the memory modules. In a manner analogous to RAID 5, parity data as well as stripe data is distributed among memory modules 13a–13d.

If a memory module is lost, data recovery is accomplished by calculating the values of the missing data in the manner described above. When the failed memory module is replaced, the reconstructed data is stored in the new memory module.

Referring again to FIG. 1, logic unit 12 calculates the parity data in the manner described above. This calculation may be performed automatically for all data being written to system memory. Logic unit 12 then determines how data and parity data is to be distributed among the memory modules 13a–13e. This distribution may vary—as explained above, the parity data may reside on a single memory module or it may be distributed. If required, logic unit 12 reconstructs missing data, such as in response to a memory installation or diagnostic instruction from software running on the processor. Thus, logic unit 12 is assumed to have the necessary arithmetic circuitry for performing the parity calculations and data recovery, as well as whatever demultiplexing and switching circuitry is required for "striping" data to the appropriate memory module.

An additional feature of the invention is the use of "hotplugging", which enables a memory module to be removed without removing power to the entire computer system. Each memory module 13a–13e is connected to the power supply (not shown) by means of a switch 14. If the switch is opened, the associated memory module 13 no longer receives power and may be removed without affecting operation of the rest of the system. Switches 14 may be implemented with simple transistor devices, such as FETs (field effect transistors). A button 14a on the memory module 13 could be used to activate the switch 14.

Figure 5:
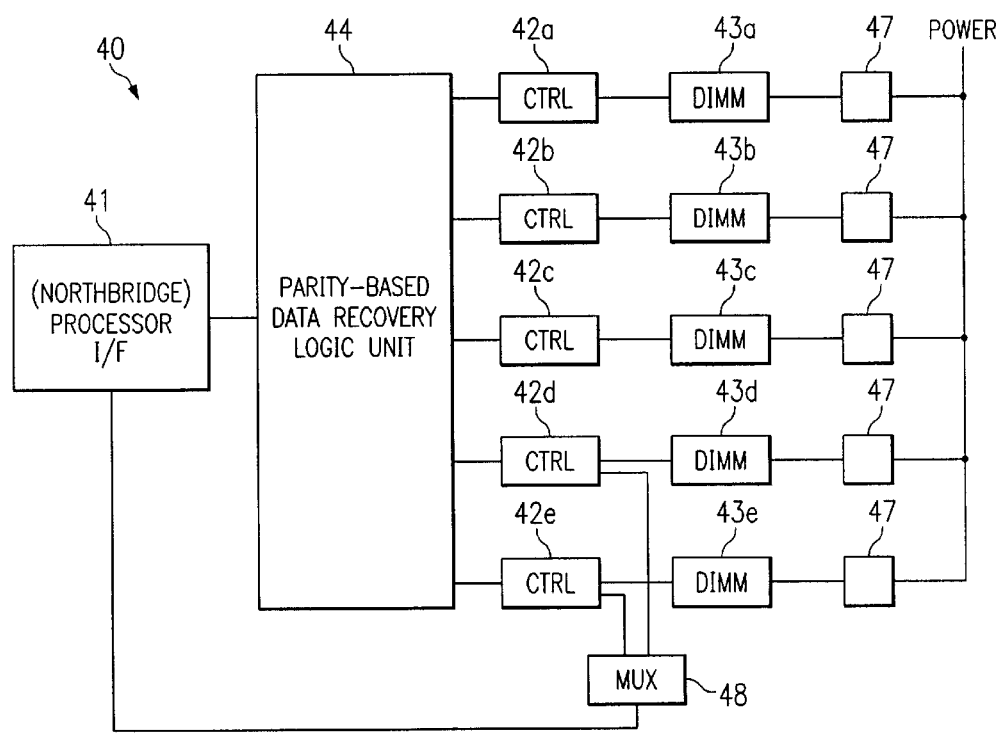
FIG. 5 illustrates an alternative embodiment of a memory system, and illustrates how a commercially available memory chipset may be modified in accordance with the invention.

FIG. 5 illustrates a memory system 40, and illustrates how a commercially available memory chipset may be modified in accordance with the invention. In the example of FIG. 5, an existing memory chipset, having a processor interface 41, controllers 42a–42d, and memory modules 43a–43d, has been modified with the addition of FPGA 44, an additional controller 42e, and an additional memory module 43e.

In the example of FIG. 5, the memory modules 43 are DIMMs. An example of controllers 42 are memory repeater hubs for RDRAM (MRH-Rs), of the type found in the Intel A70 memory chipset manufactured by Intel Corporation. These hub controllers 42 provide for multiple channels off expansion channels of a larger system memory controller. Although only one connection is shown, each controller 42a–42e is connected to the processor interface 41. If an additional controller 42e is added, a multiplexer 48 may be used to connect that controller.

In then commercially available form (without parity-based data recovery capability), controllers 42a–42d are operable to interleave data among memory modules 43a–43d. "Interleaving" is a process in which the processor (not shown) alternates communication between two or more memory modules. The use of interleaving saves processing time by addressing a second portion of memory while a first portion of memory is resetting. For purposes of the present invention, the data distribution functionality of controllers 42 may be used to implement the "striping" function for the above-described parity-based data recovery scheme.

The modified chipset illustrated in FIG. 5, which has five memory modules 43a–43e, provides the same data storage capacity as the original (unmodified) chipset having four memory modules 43a–43d. If less storage capacity is acceptable, the same chipset could be modified without adding an additional controller or memory module.

Like system 10, system 40 has switches 47 for "hotplugging". Any one module 43a–43e may be removed by removing power to only that module.

Figure 6:
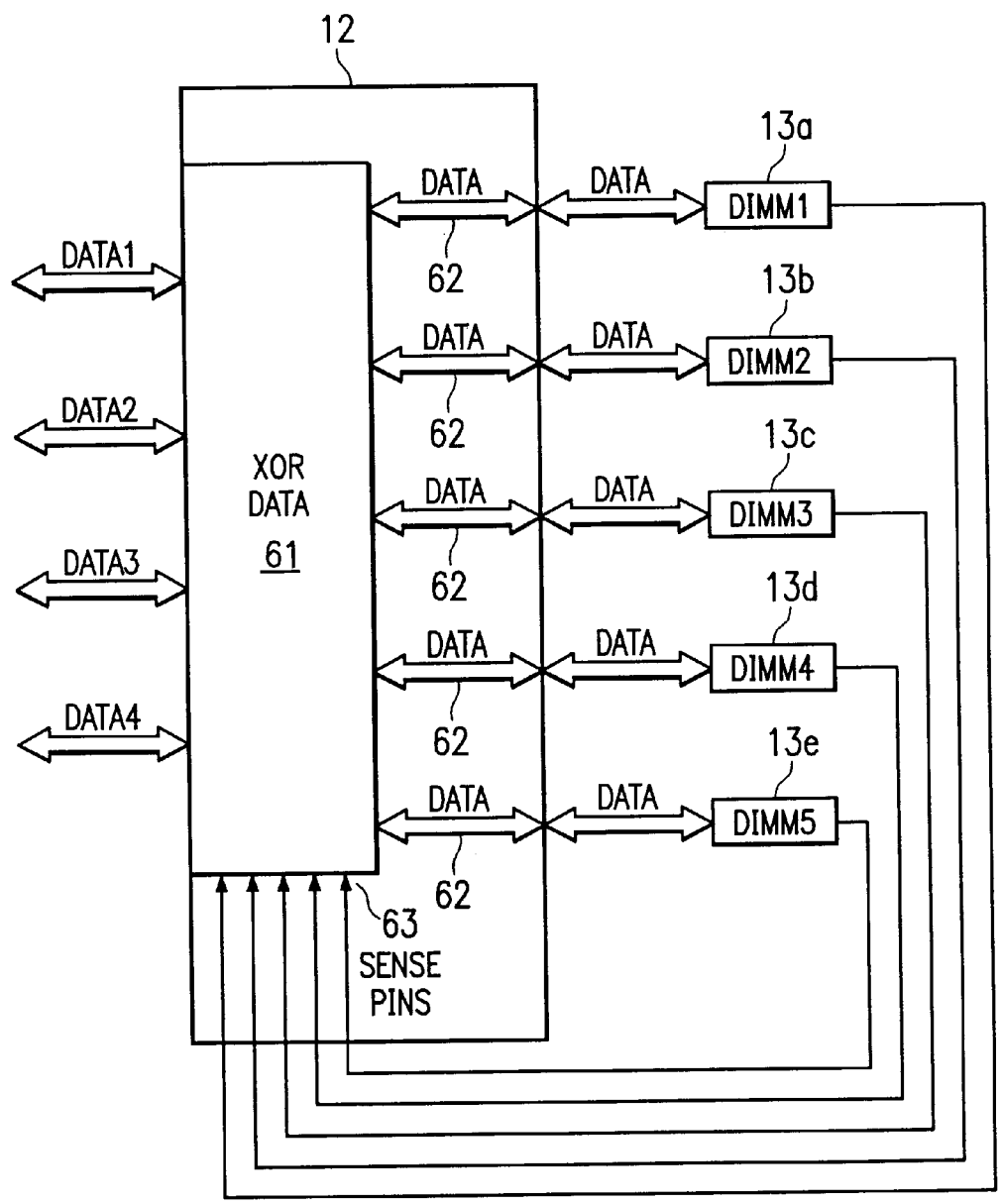
FIG. 6 illustrates the logic unit of FIG. 1 in further detail.

FIG. 6 illustrates the logic unit 12 of FIG. 1 in further detail. The logic unit 12 receives input data (data 1–data 4) from the processor. An XOR logic unit 61 operates on the input data to calculate parity data. Data distribution circuitry 62 ensures that the input data and the parity data are properly distributed among the appropriate DIMMs 13a–13e. If a DIMM is removed, sense pins 63 detect its absence, which results in calculation of recovery data by the XOR logic 61, and rebuilding of a new replacement memory module.

Other Embodiments

Although the present invention has been described in detail, it should be understood that various changes, substitutions, and alterations can be made hereto without departing from the spirit and scope of the invention as defined by the appended claims.

What is claimed is:

1. A method of providing recoverable data stored in system memory of a processor-based computer system, the computer system having a processor interface to the memory system, comprising the steps of:

arranging the system memory as a set of memory modules;

receiving, at a data recovery logic unit, from the processor interface, input data to be stored in the memory modules;

calculating parity data based on the input data, using the data recovery logic unit;

storing the input data in the memory modules, such that a number of the memory modules each contain a portion of the input data; and storing the parity data in the memory modules
wherein the storing steps are performed using controllers, one controller connected between the logic unit and each memory module, the controllers further being in communication with the processor interface and operable to distribute the input data and parity data among the memory modules.

2. The method of claim 1, wherein the arranging step is performed with DIMMs.

3. The method of claim 1, wherein the calculating step is performed by a logic unit that receives the input data prior to storage in the memory modules.

4. The method of claim 1, wherein the storing steps are performed such that one of the memory modules stores the parity data.

5. The method of claim 1, wherein the storing steps are performed such that a number of memory modules store the parity data.

6. The method of claim 1, wherein the storing steps are performed such that all data is distributed among all memory modules.

7. The method of claim 1, further comprising the step of switchably connecting each memory module to a power supply, such that a memory module may be removed without affecting power to the rest of the computer system.

8. A memory system for a processor-based computer, the computer having a processor interface to the memory system, comprising:
   a set of memory modules, each capable of receiving a portion of a larger block of data;
   a data recovery logic unit programmed to receive input data from the processor interface, to calculate parity data associated with the input data, to add the parity data to the input data to form a block of data, and to calculate recovery data if one of the memory modules fails; and
   a controller associated with each memory module and in communication with the processor interface, each controller operable to receive blocks of data from the logic unit and to distribute blocks of data among the memory modules.

9. The system of claim 8, wherein the memory modules are DIMM modules.

10. The system of claim 8, wherein the controller distributes the block of data among the memory modules by delivering all parity data to one of the memory modules.

11. The system of claim 8, wherein the controller distributes the block of data among the memory modules by delivering parity data to a number of the memory modules.

12. The system of claim 8, wherein the controller distributes the block of data among the memory modules by distributing all data among all memory modules.

13. The system of claim 8, wherein the logic unit is a field programmable logic unit.

14. The system of claim 8, further comprising a switch associated with each memory module for turning off power to that memory module.

15. The system of claim 8, wherein the logic unit is further programmed to detect when a memory module has been removed.

16. A method of modifying a computer system having a set of memory modules connected to a processor via a processor interface and having a memory controller associated with each memory module, comprising the steps of:
   connecting a logic unit between the processor interface and each controller, the logic unit operable to receive input data from the processor interface and to calculate parity data;
   wherein the memory controllers are further operable to receive input data from the processor interface, to receive the parity data from the logic unit, and to distribute the input data and the parity data among the memory modules.

17. The method of claim 16, wherein the memory controllers are RDRAM memory controllers.

18. The method of claim 16, further comprising the step of providing a switch associated with each memory module for hot swapping the memory module.

19. The method of claim 16, further comprising the steps of adding at least one additional memory module and at least one multiplexer.

* * * * *